US009420391B2

(12) United States Patent
Wiesbauer et al.

(10) Patent No.: US 9,420,391 B2
(45) Date of Patent: Aug. 16, 2016

(54) MICROPHONE CONFIGURATION AND CALIBRATION VIA SUPPLY INTERFACE

(71) Applicant: Infineon Technologies AG, Neubiberg (DE)

(72) Inventors: Andreas Wiesbauer, Poertschach (AT); Christian Jenkner, Klagenfurt (AT); Johannes Hohl, Landskron (AT); Ernesto Romani, Munich (DE); Christian Ebner, Munich (DE); Joseph Hufschmitt, Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 14/557,823

(22) Filed: Dec. 2, 2014

(65) Prior Publication Data

US 2016/0157036 A1 Jun. 2, 2016

(51) Int. Cl.
*G06F 7/00* (2006.01)
*H04R 29/00* (2006.01)

(52) U.S. Cl.
CPC .................................... *H04R 29/004* (2013.01)

(58) Field of Classification Search
CPC ............................ H04R 29/004; H04R 29/006
USPC ........ 455/418, 563, 566; 381/56, 57, 98, 102; 235/376, 435
See application file for complete search history.

(56) References Cited

U.S. PATENT DOCUMENTS

2009/0034747 A1* 2/2009 Christoph ................ H03G 3/32 381/71.4
2010/0099394 A1* 4/2010 Hainzl ...................... G06F 1/32 455/418
2014/0112483 A1* 4/2014 Etter .................... H03G 3/3005 381/56
2014/0364171 A1* 12/2014 Heiman ................... H04R 3/12 455/566
2015/0235656 A1* 8/2015 Kim ................. H04W 52/0251 455/563

* cited by examiner

*Primary Examiner* — Daniel St Cyr
(74) *Attorney, Agent, or Firm* — Escweiler & Associates, LLC

(57) ABSTRACT

A microphone or a microphone sensor system operates with a sensor interface that receives a supply voltage at a supply terminal. The sensor interface detects a command at the supply terminal based on a change in the supply voltage and communicates the command or data related to the command to a component of the sensor system. The supply terminal is a bidirectional terminal that further communicates data related to the sensor system via the supply terminal.

24 Claims, 7 Drawing Sheets

MICROPHONE CONFIGURATION AND CALIBRATION VIA SUPPLY INTERFACE

FIELD

The present disclosure relates to microphone devices and more specifically, to configuring and calibrating microphone devices via a supply interface.

BACKGROUND

Engineering of microphone systems strives to accommodate large dynamic frequency ranges with a low consumption of power. Microelectromechanical system (MEMS) microphones comprise systems integrated on a chip (e.g., a microphone chip or a silicon microphone), in which a pressure sensitive diaphragm is etched into silicon or another substrate for sensing acoustic signals. The MEMS microphone can have an integrated preamplifier on the chip or other integrated components such as a built-in analog-to-digital converter (ADC) circuit on the same CMOS chip or on a MEMS die and a separate ASIC die, which enables the chip to operate as a digital microphone capable of being readily integrated with various modern digital products. There continues to be a need for an audio system with integrated components that processes data more efficiently and with greater variability in operation.

DETAILED DESCRIPTION

Figure 1:
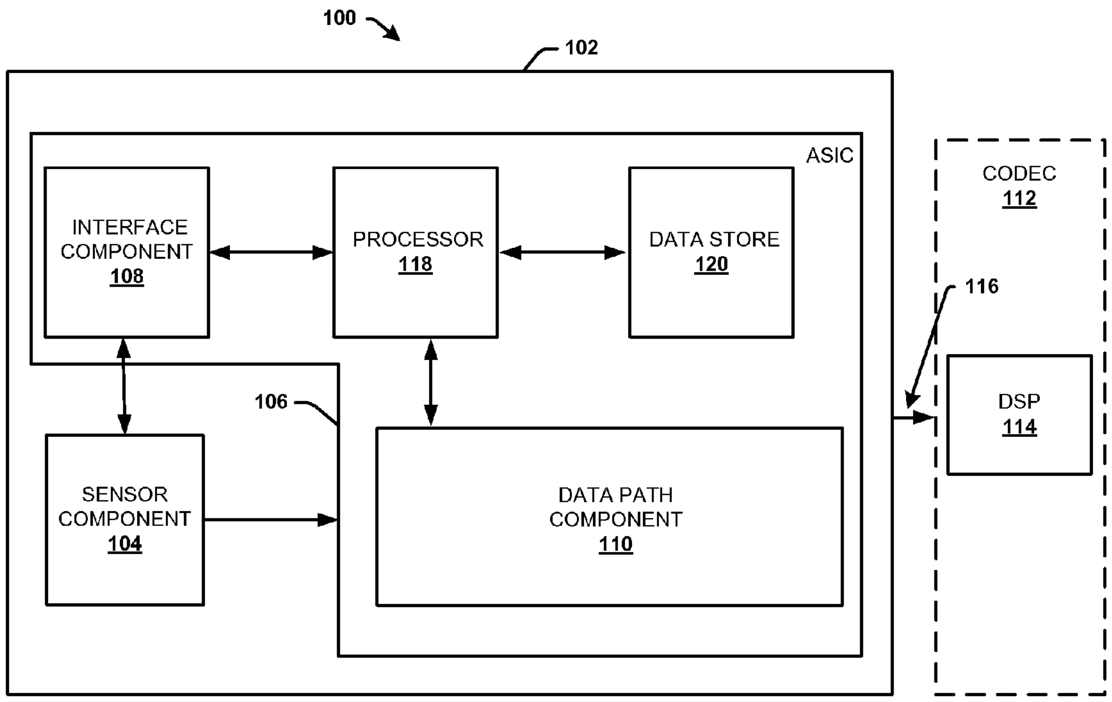
FIG. 1 is a block diagram illustrating an audio or microphone system in accordance with various aspects.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a circuit, a processor, a process running on a processor, a controller, an object, an executable, a program, a storage device, a computer, a tablet PC and/or a mobile phone with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

In consideration of the above described deficiencies of audio systems for functioning audio components with large dynamic ranges and low power, an audio system is described that is configured to operate with a bidirectional interface that also provides a supply signal. A microphone system on a chip, for example, can comprise various different interface pins or interface components. In one embodiment, an interface component that includes a supply interface can operate to enable a supply voltage that powers one or more components of the microphone system and also receives and communicates data at the same supply interface.

The interface component can comprise a $V_{DD}$ terminal or a supply pin of a microphone chip that operates to provide power to the microphone chip, a microphone system or microphone components operationally connected within the system. A microphone system can comprise various interfaces, in addition to the $V_{DD}$ interface for power, such as a clock terminal for communicating a clock signal and processing or controlling data based on the clock signal. The system can include a data pin that communicates data to or from the system, such as a processed or modulated output, in which for microphones can comprise an electrical signal that is modulated and derived from acoustic signals being sensed at the sensor component of the system. In another embodiment, the microphone system can comprise an interface component that includes a single interface terminal or pin that is configured to operate as a bidirectional interface to communicate data back and forth with components of the system while concurrently being configured to supply power to the components of the microphone system based on signal swings.

Although a separate data interface could be utilized for digital silicon microphone chips this interface could block "normal" data output whenever using the data interface for configuration, calibration or testing data. A microphone system is described that comprises a sensor component configured to detect an audio signal based on an electrical signal generated from a membrane change. A data path component is configured to process the electrical signal from the sensor component to generate an output signal at an output terminal. An interface component comprises a supply terminal configured to receive a supply signal from a power source and concurrently receive or transmit one or more data commands to communicate one or more parameters related to the sensor component or the data path component. Thus, a single interface can provide power to system components, parameters for modifying component settings, and communicate data related to the components. Additional aspects and details of the disclosure are further described below with reference to figures.

FIG. 1 illustrates an example of an audio system, a microphone system or a microphone sensor system 100 that operates to facilitate a communication of a datum and a supply signal to provide a dynamic range of acoustic or audio processing in accord with various aspects. The audio system 100 can comprise audio components of an audio device, which can include, for example, a recording device (e.g., a microphone, a digital recorder, or the like), a computer system having a processor and memory, a mobile device, or other device that is configured to operate sound recording, sound processing or communications within audio ranges. The audio system 100 can also comprise modulator processing components for processing acoustic or audio signals as well as additional components.

The audio system 100, for example, can comprise a silicon microphone (SIMIC) device 102, or other sound detecting modulating device, a receiving component or client side component having a coder/decoder device (CODEC) 112. Although a silicon microphone is discussed, other microphone types or audio devices detecting audio signals are also envisioned as one of ordinary skill in the art can appreciate. The SIMIC device 102 comprises a sensor component 104, such as an acoustic sensor or a MEMS component, for example, that operates to generate an analog signal according to a change in a membrane or a diaphragm that results in a differential (e.g., voltage or signal differential) being generated from audio signals acting upon the diaphragm. For example, the sensor 104 can operate to provide electrical signals to an application specific integrated circuit (ASIC) 106 by generating an input voltage signal from the membrane change from an audio signal. The ASIC 106 can comprise various components discussed herein that are integrated on the same silicon substrate or the same ASIC die that is separate from the sensor component 104 located on another die such as a CMOS chip or a MEMS die. Alternatively, the sensor component 104 and the ASIC 106 can be integrated on a same substrate, die or semiconductor package as the SIMIC device 102.

The ASIC 106 and the sensor component 104 can be integrated in a single acoustic package. The ASIC receives signals that can be a single point or a differential signal having differential signal paths for different polarities, in which the sensor component 104 can be a single plate or a dual plate MEMS respectively for sensing signals. The ASIC 106 operates to receive voltage signals at an input to perform signal readout and processing operations such as analog-to-digital conversions. The ASIC 106 can operate to handle a large dynamic signal range at low power consumption levels, in which components of the system 100 can be configured based on data from the same interface as the supply interface, such as the interface component 108. The ASIC 106 can process signals from the sensor component 104 as a function of data and a supply signal that are provided via the interface component 108.

The interface component 108 can comprise a single supply terminal that operates to provide a supply signal (e.g., a supply voltage or current) to one or more other components of the system for power. For example, the interface component 108 can comprise a $V_{DD}$ interface that provides a supply voltage to the system 100 from an internal or an external source, such as a current or a voltage source for powering the sensor component 104 or a component of the data path component 110.

The data path component 110 can include one or more different components for signal processing. For example, the data path component 110 can comprise a high-impedance biasing network and a buffer, amplifier or attenuator for buffering the MEMS signal or other sensor signal to a data processing path of the data path component 110. Limitations in voltage swings can be overcome, for example, by setting the supply level of a MEMS interface circuit high enough, by utilizing an internal multiplication of a regulated supply voltage, for example. The data path component 110 can then operate to process the electrical signal generated from the sensor component 104 to generate an output signal at an output terminal 116 to an external system or device, such as a CODEC 112 at a digital signal processor 114, in which the CODEC 112 can be a device or computer program that encodes or decodes a digital data stream or signal via the digital signal processor 114. The system 100 can further comprise a processor 118 and a memory 120 that can store executable instructions to be executed by the processor 118.

In one aspect, the interface component 108 comprises a supply terminal configured to receive a supply signal from a power source to supply a power signal (e.g., a voltage supply or a current supply) to the sensor component 104 or the data path component 110. The interface component 108 is configured to concurrently receive or transmit one or more data commands to communicate one or more parameters related to the sensor component or the data path component concurrent to or at the same time as receiving or transmitting data. The data, for example, can be communicated to indicate a parameter or a setting of one or more components (e.g., a gain setting or gain parameter) while the interface component 108 also receives a supply voltage at the same terminal or pin (e.g., the $V_{DD}$, or supply terminal).

In another embodiment, the interface component 108 can operate as a bidirectional interface that communicates in two different directions for transmitting or receiving data. For example, the interface terminal or pin of the interface component 108 can be utilized to supply a voltage source as well as data to the system 100. The data, for example, can be detected as a function of supply voltage level changes in the supply voltage at the interface component 108. The interface component 108 can derive data from the voltages swings and transfer information, commands, parameters, settings or other such data to components of the microphone or audio system 100 to configure operational processing of microphone signals. Additionally or alternatively, the interface component 108 can communicate or transfer information via the same terminal based on current consumption changes.

The current level changes can be detected by the interface component 108 as a function of consumption changes in a component of the system or the system as a whole. The interface component 108 is operable in a digital or an analog silicon microphone device/system without interfering with the functionality of the sensor component 104, the data path component 108 or any other interface such as a designated data interface, clock interface, or other interface.

The interface component 108 operates to receive or transmit commands to operate the sensor component 104 or one or more components for processing audio signals via the data path component 110. Additionally, the interface component 108 determines one or more parameters from the commands. The parameters, for example, can comprise at least one of a calibration setting, a voltage bias, a current bias, a gain setting for a component with a gain control, a clock value, a magnitude setting of an interface driver, a digital oscillator level, an internal local oscillator frequency or phase, a feedback value, a voltage pull-in value (e.g., for a voltage membrane pull in amount), a membrane sensitivity level, a mobile device front end functional test value (e.g., for accuracy over temperature or process variations) of a mobile device front end, other parameters or operational settings. A front end can include a communication platform, which comprises electronic components and associated circuitry that provide for processing, manipulation or shaping of the received or transmitted signals via one or more receivers, transmitter or other component of a mobile communication, for example.

The interface component 108 is configured to derive the parameters from one or more commands that are detected from changes in the supply voltage of the supply signal. The interface component 108 further generates a digital signal based on the one or more parameters derived from the commands and facilitates a set of operations of the sensor component or the data path component with the digital signal derived from the parameters or the commands. These operations, for example, can comprise a calibration operation that initiates a process setting to the sensor component or the data path component such as a gain setting, a bias setting, an internal current consumption, a local oscillator frequency setting, or another parameter that can calibrate or control a setting to the data path component 110. The operations can also include a configuration operation that generates or programs a mode of operation, a sensitivity level of the sensor or other component based on a voltage response level (e.g., for a membrane sensitivity in a MEMS), a clock cycle, a counter value, a sequence of processes or algorithm initiation, such as different power level modes of operation, a security mode of operation involving one set of communication protocols over another mode having a different number of data bits, a rate or period for communicating redundancy data, a bias level (e.g., a voltage bias, current bias) or a process parameter level to the sensor component or the data path component. In addition, the operation can include a testing operation that generates a value of a loopback path, a characteristic value or a test level of the sensor component or the data path component. The interface component 108 can thus receive and determine a communication or a command from the voltage signal or other supply signal via a supply terminal in order to facilitate a calibration operation, a configuration operation, or a testing operation without interrupting functionality of the microphone system 100, such as outputting digital data in response to a sensed audio signal.

In another aspect, the interface component 108 can derive write data from voltage swings to perform write operations to one or more components of the microphone system 100. Additionally, read operations can be generated via the same interface terminal based on current swings. Other commands can also be generated via the interface component 108, such as an erase command, overwrite, interface shut-off or other system commands, for example.

Figure 2:
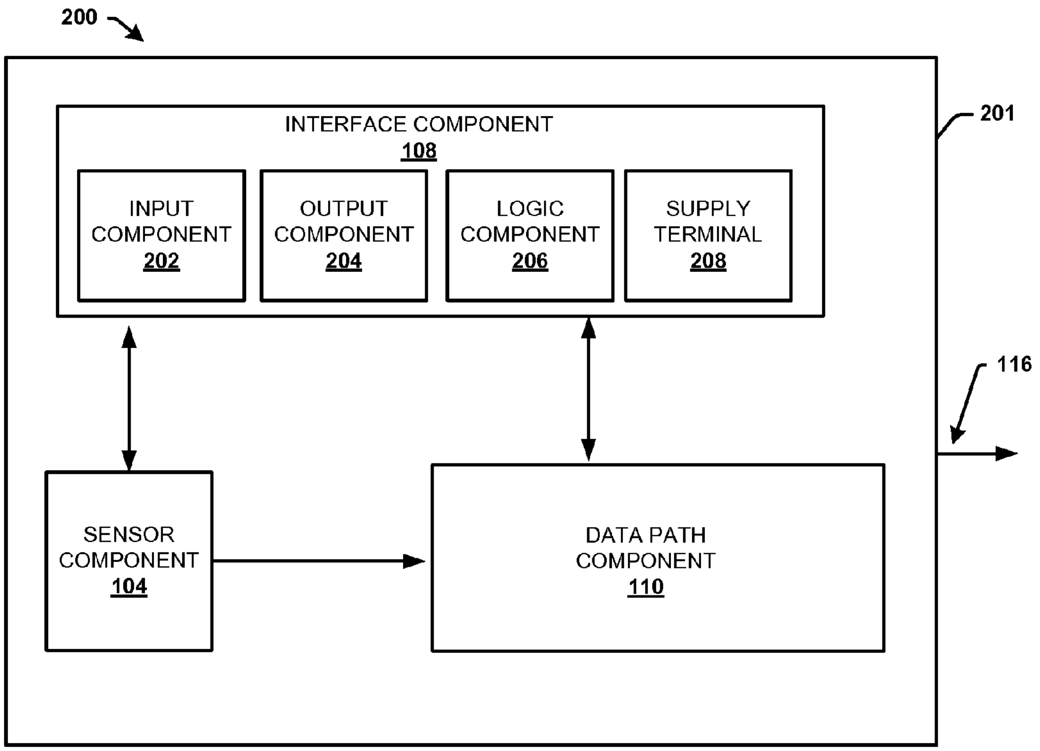
FIG. 2 is a block diagram illustrating another audio or microphone system in accordance with various aspects.

Referring now to FIG. 2, illustrated is a microphone or audio system to communicate data and a supply signal via an interface terminal in accordance with various aspects. The system 200 includes similar components as discussed above, and further includes a communication input component 202, a communication output component 204, a logic component 206 and a supply terminal 208.

The system 200 can comprise a microphone device or acoustic device 201 that operates as an analog microphone device or a digital microphone device, in which the components of the device 201 operate to receive and communicate in an analog domain, a digital domain or a combination of the analog or digital domain. For example, the interface component can include the supply terminal 208, and further comprise additional analog interface terminals or digital terminals for inputting and outputting one or more signals or data with components of the microphone device 201. The supply terminal 208 can include a single terminal or pin for receiving a supply signal such as an analog voltage signal for supplying power to one or more components of the data path component 110 or the sensor component 104. The supply terminal 208 can enable the interface component 108 to operate as a bidirectional interface configured to receive and transmit the one or more commands based on signal swings. Command data, for example, can thus be concurrently received or communicated via the supply terminal 208 while receiving a supply voltage as a supply signal.

The microphone system components can operate in a voltage range, for example, in which limitations in voltage swings can be overcome by setting the supply level of a MEMS interface circuit by utilizing an internal multiplication of a regulated supply voltage. The voltage supply can thus operate within a range of voltage that enables swings to be generated without interfering with operation and also to communicate data for programming operations within the system.

For example, the input component 202 can operate to facilitate communications from one or more devices that are external to the system 200 or from internal components of the system 200. The input component 202, for example, is configured to determine or derive the data commands based on a change of a voltage level of the received supply signal at the supply terminal 208 of the interface component. The input component 202 can detect voltage swings at the supply terminal 208, and also operate to derive commands based on the detected voltage swings. The input component 202 and the logic component 206 operate to determine parameters from the commands and communicate the parameters to the sensor component 104 or the data path component 110 to facilitate a control setting, an operational parameter or a programming operation for the processing of signals generated by the microphone system 200.

The input component 202 can include a comparator (not shown) coupled to the logic component 206 in order to compare a voltage swing magnitude with a reference. For example, the input component 202 can compare voltage swings with a predetermined threshold or a reference level. Based on a condition of the predetermined threshold being satisfied, one or more bits can be associated with the voltage swing. For example, a voltage swing above the predetermined threshold can be equated with a one, while a voltage swing below the predetermined threshold can be equated with a zero. The input component 202 can also implement the converse, in which an indication below the threshold is a one while above the threshold is a zero. The input component 202 further operates to provide the comparison to the logic component 206 that then facilitates one or more commands derived from the supply signal fluctuations, changes or swings in a set of logic bits, for example. The logic component 206 communicates the command, an operational parameter, or a setting within the bits to a designated component of the data path component 110 or the sensor component 104, for example. The logic component 206 thus operates to control one or more signal processes or operations related to a component of the data path component 110 or the sensor component 104 for signal processing, configuration, calibration or testing.

The output component 204 operates to determine information related to the sensor component or the data path component and transmit the information in the one or more commands via the supply terminal 208 of the interface component 108. For example, the output component 204 can detect a current consumption from one or more components and communicate data derived from the current changes via the supply terminal 208. The logic component 206 can derive one or more commands or data signals from the detected current fluctuations or changes. The data can then be communicated via the supply terminal 208 while also receiving a supply voltage at the same terminal.

Figure 3:
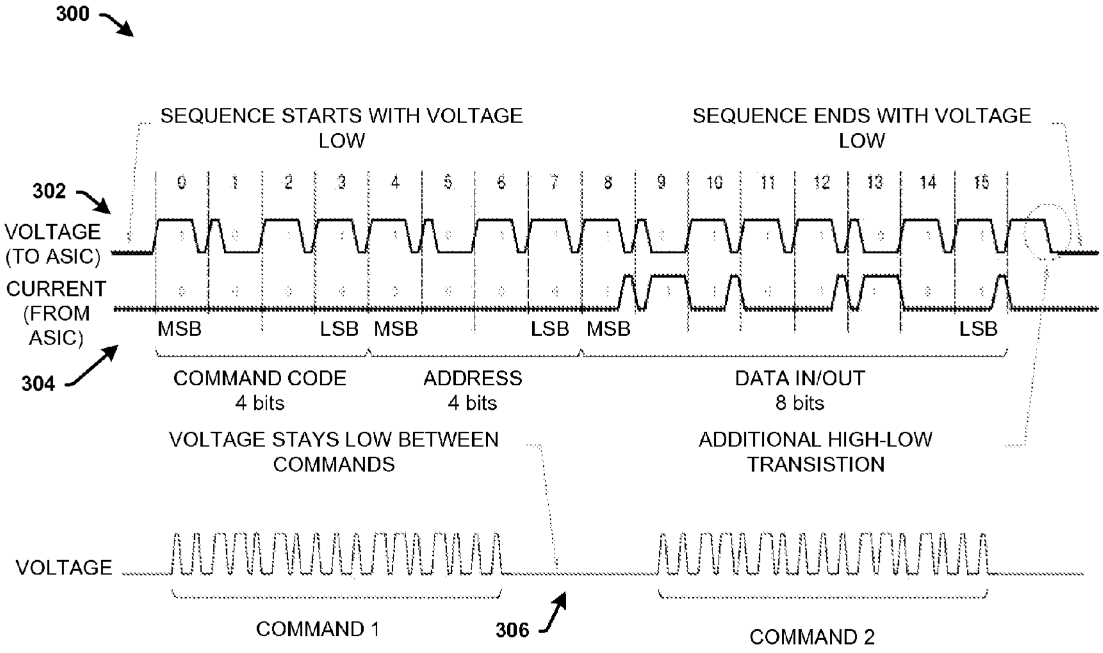
FIG. 3 is a graph illustrating input and output communications of an interface component of an audio or microphone system in accordance with various aspects.

Referring to FIG. 3, illustrated is an example of communications 300 received by the interface component 108. As discussed above, the input component 202 operates to generate data commands based on a change of a voltage level of the received supply signal that concurrently powers one or more components of a microphone device. For example, the supply voltage can be approximately 2 Volts, in which the supply voltage could swing between 2V and 2.8V, or the supply voltage could operate within a different range, depending upon the configuration of the components. A predetermined threshold can comprise the range of 2V to 2.8V or specific threshold level, for example, such as approximately 2.5V or 2.9V, in which the predetermined threshold can operate as a partition to separate or distinguish between swings communicating data and a normal operational power swing. In response to the supply signal amplitude being above or below the threshold for a certain period of time, a logical one can be detected for a first bit, and in response to being above or below the threshold for a different period of time a logical zero can be determined, for example.

In one example, a voltage sequence 302 can initiate within a predetermines threshold range or a predetermined voltage range, in which the sequence is being received and detected via the input component 202, for example, and further generated in the logic component 206 for further communication within the microphone system. The voltage sequence 302 can be initiated as a low signal edge, for example. In response to a voltage swing satisfying a condition of the predetermined threshold, such as exceeding above the voltage range, a one or a zero bit is generated for the command. A command, for example, can comprise a set number of N bits, such as four bits, eight bits, or other number of bits (e.g., 16 bits), in which N is an integer that is greater than one. A counter (not shown) or a clock can indicate a time in which the voltage swing satisfies or exceeds the threshold range. In response to a first time being greater than a second time, a one can be generated as the first bit, for example, which can be a most significant bit (MSB) or a least significant bit (LSB). In response to the second time being shorter than the first time, a zero can be generated as the second bit, which can be an LSB or an MSB, for example.

Other examples for deriving the commands from the signal swings at the supply terminal can also be envisioned. For example, a satisfaction of the threshold voltage range or level can be based on a voltage swing that is lower than a voltage range at certain times. Additionally or alternatively, the voltage range can comprise a constant voltage level, in which going below indicates a one or a zero for a bit of a command, or going higher indicates a one or a zero for a bit of a command. A command sequence can end with a low voltage edge, or a voltage within the level or range specified for determining the communications, for example. A pause 306 or low signal period during a certain time amount can indicate the end of a command, as well as a determination of a certain number of bits, for a fixed command length, for example.

In addition, the command can be divided up into sections that indicate one or more different parameters, operations, configurations, calibrations or testing processes to be implemented. A command can be a digital data word, a byte, or other format of bits, for example, that comprises a command code section, an address section, and a data section. The command code section can identify an operation (e.g., write, erase, sense, store, stop, etc., or other procedure related to a particular signal processing component). A setting can be a value or a mode operation, as discussed above, or an initiation of an operation process together with a setting value, for example. The command can initiate an operation or a plurality of operations for a testing process or a calibration process. The command can also provide a configuration of a component to operate in a particular mode or a particular range of frequency or range of power for testing, calibrating, or setting the component on the fly or in the field, for example. The address section can identify where the command is to be implemented or communicated to, and the data section can comprise one or more values, gains settings, mode control data for establishing operations, configurations or testing of components.

The output component 204 determines information related to the sensor component 104 or the data path component 110 in a similar way as discussed above with regards to the input component, but is based on current fluctuations or swings from components within the microphone system, such as from the ASIC 106 or the data path component 110, for example. The current swings are utilized by the output component 204 to derive the commands for communication by sensing the swings related to a certain current consumption threshold or current consumption range or level, for example. The logic component 206 can generate one or more commands from the current level changed detected and enable communication of the commands externally via the supply terminal 208. Consequently, the supply terminal 208 is a bidirectional terminal that receives and transmits data commands while receiving a supply signal that powers the microphone system.

In one example, a current communication or an output communication 304 can be based on a current level and a current change or swing. The current level, for example, can comprise 200 micro amperes, in which 800 micro amperes could be added to indicate a higher current past a threshold level. In response to the current rising above the threshold, a one could be indicated in a bit slot, which can correspond to a certain time period. In response to the current not being above the threshold, then the current swing could indicate a zero for a bit within a certain time period. Alternatively or additionally other protocols or variations could be envisioned, such as discussed above with respect to the voltage commands.

In another embodiment, the threshold for determining a current change or a voltage change with respect to receiving or transmitting data respectively can be modified from one range to another range. The system or components of the system can be programmed to operate at a different power setting via the communicated data from the supply terminal. In response to a supply setting or configuration being entered, the system or component can operate with a second, different threshold for determining communications based on voltage swings or current swings related to the second threshold while also operating with a different power range, such as in different power modes for different ranges. The configurations or settings (e.g., a gain or a bias setting) can independently be altered by a transmission of data commands through the supply terminal 208 to modify the system output at the output terminal 116, for example, while the system 200 can also be dynamically modified to determine data commands at different swing thresholds when operating at different power levels, for example.

Figure 4:
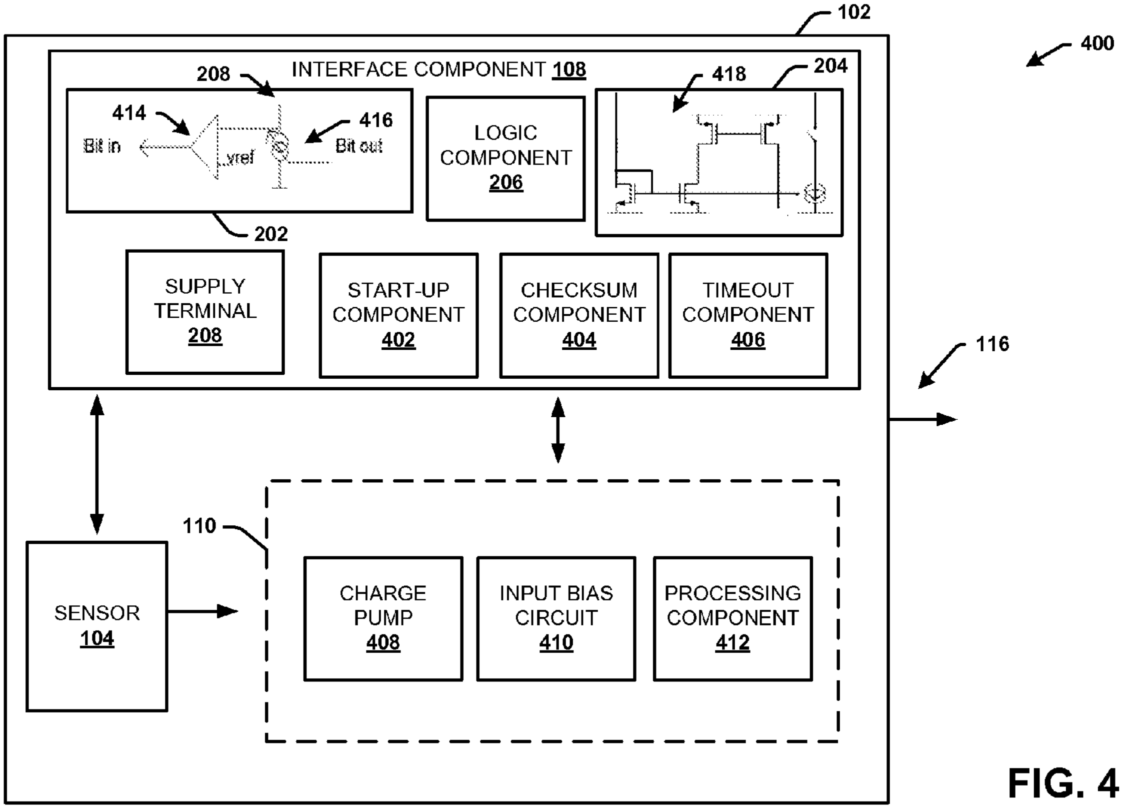
FIG. 4 is a block diagram illustrating another audio or microphone system in accordance with various aspects described.

Referring to FIG. 4, illustrated is another example of a microphone system 400 in accordance with various aspects. The system 400 comprises similar components as discussed above as well as additional components. The interface component 108, for example, further includes a start-up component 402, a checksum component 404 and a timeout component 406. The data path component 110, for example, comprises a charge pump 408, input bias circuit 410 and a processing component 412.

The data path component 110 can comprise one or more processing components for generating an output based on detected acoustic or audio signals. The audio system 400 can be a differential audio system comprising a microphone (e.g., a digital silicon microphone) that comprises a MEMS sensor component 104 and the data path component 110, which includes the processing component 412. The processing component 412 can include a continuous-time MEMS interface, a switched capacitor delta sigma modulator, a voltage multiplier or other signal processing components, for example.

The data path component 110 of the ASIC (not shown) can provide a high-voltage bias to the sensor component 104 via a charge pump 408, which can be set or biased based on one or more commands received via the supply terminal 208. The sensor component 104 provides a voltage signal as a differential signal or as a single-ended signal to the ASIC's readout components via the data path component 110, which can include a differential processing path or a single-ended processing path that couples the components therein. In addition, the sensor component 104 can comprise a dual-back plate MEMS for example, or other sensor elements for detecting one or more physical parameters. The bias voltage is fed to the membrane of the sensor component 104 via the charge pump 408, which can be calibrated or set via a command received by the interface component 108, for example.

In addition, an input bias circuit 410 can include a Giga-Ohm Bias circuit, for example, or other bias circuit that further provides a voltage or current operating point to the data path component 110. At the end of a charging phase, in which both the charge pump 408 and the bias circuit 410 are set to low impedance, both components are switched into high impedance mode, and thus a charge can be trapped (e.g., as a sensitivity voltage or V pull-in) on both MEMS capacitances of the sensor component 104, for example. With a movement of the membrane, the capacitor values change and a voltage can be read at the ASIC input using one or more processing components 412, such as a MEMS Buffer, which can operate to drive a modulator that can further incorporate a loop filter, a quantizer (e.g., a tracking ADC) or other component for providing an output, for example.

In an aspect, the input component 202 can include a comparator 414 that compares a voltage swing with a voltage reference as the threshold and based on a difference, the comparator 414 can generate a bit value, for example, or provide a comparison result to the logic component 206 for the generation of a communication with a bit command. An output current swing can then further be generated by one or more variable current sources 416 as well for communication outside of the supply terminal 208 based on one or more current commands derived from the output component 204 and the logic component 206.

The output component 204 can also comprise one or more transistor switches that can be configured in a current mirror circuit 418 or other configuration, which can be coupled to a current source, a switch or other components to read changes in the current (e.g., $I_{DD}$) and generate data related to the current swings. The output component 204 can operate to alternate a current signal based on a current consumption level, such as a high $I_{DD}$ or a low $I_{DD}$, and provide the data to the logic component 206. The logic component further communicates the data as an output, via the terminal 208, that includes command data or read data related to the components of the system 400.

The output component 204 can also be configured to detect or generate the current level changes from the system 400 or one or more components of the system. The output component 204 then further provides a data output to the logic component 206, which generates command data via the supply terminal 208. The logic component 206 thus operates to implement write commands to the components of the system 400 based on the input component 202, and generate read commands according to the output component 204.

In another aspect, the interface component 108 of FIG. 4 comprises the start-up component 402, the checksum component 404 and the timeout component 406. The start-up component 402 is configured to detect a powering phase of the sensor component or of a component of the data path component 110 such as the charge pump 408, the input bias circuit 410, the processing component 412 or other component of the system 400. The start-up component 402 operates to activate the interface component 108 in response to the detected powering phase, and inactivate the interface component 108 in response to a completion of the powering phase. The power phase can be a powering up of the microphone device 102, for example, which the start-up component 402 detects. In addition or alternatively, the start-up component 402 can further detect an absence of the one or more commands from the supply signal. The start-up component 402 can further inactivate, disengage, or operate a sleep mode with minimal power to the interface component 108 from the supply terminal 208 in response to detecting that data is not being communicated for a specific period of time or at the completion of a start-up phase, for example. In addition or alternatively, the start-up component 402 can alter a power mode of one or more components of the system or a threshold for the detection of data based on a signal swing relative to the threshold, for example.

The checksum component 404 is configured to generate a checksum operation to the one or more commands and detect whether bits of the one or more commands satisfy a first predetermined threshold related to a data integrity level. For example, a set of checksum bits could be integrated within the command being received from an external component via the supply terminal 208 or with communications to one or more components of the system 400. In addition, the timeout component 406 is configured to generate a time out sequence associated with commands being processed in the interface component 108 and cancel the one or more commands in response to the time out sequence satisfying a time threshold, for example. Thus, the interface protocol can be implemented in a way, so that "wrong" commands (protection by checksum, etc.) or improperly communicated commands would not cause unwanted information transfer. By implementing a timeout, the timeout component 406 can also inhibit a "dead lock" or failure to process in the communication by timing out a command sequence from being implemented, for example.

Figure 5:
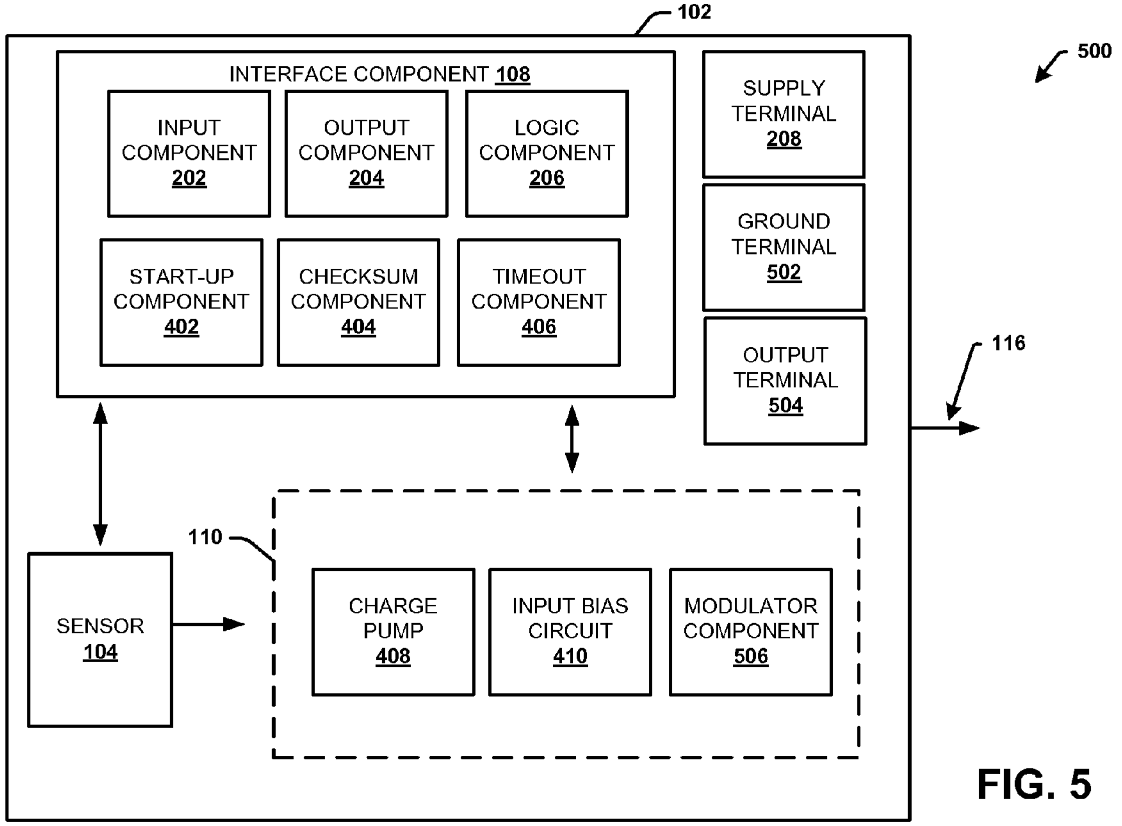
FIG. 5 is another block diagram illustrating another audio or microphone system according to various aspects described.

Referring to FIG. 5, illustrated is another example of a microphone system that can operate to communicate data and a supply signal via the same interface 208. The system 500 can be a digital system, an analog system or both having digital and analog components, for example. The microphone device 102 can include a supply terminal 208, a ground terminal 502 and an output terminal 504. The output terminal 504 can be a differential output for communicating a differential signal or a single ended output for communicating a single ended signal. In the case of a digital implementation, the output terminal can comprise a data terminal or pin for communicating data related to the microphone, such as voice data, or other data in addition to or separate from the interface component 108. The output terminal 504, for example, can include a clock pin for communicating a clock value or a left/right terminal for communicating digital data related to left or right sound or speaker information.

In addition, the data path component 110 can include a modulator or a modulator component 506 for modulation of one or more electrical signals. In microphone applications, the voltage swing to be processed is relatively small in such a way that a voltage swing present at the modulator and the voltage differential at the input is directly related to the sound pressure level (SPL) that a microphone can capture. Typical speech is at SPLs below about a level of 94 dB SPL. However, loud communications such as loud music can go up to a level of about 120 dB SPL, which can vary depending on how the MEMs sensitivity is set to voltages in the range of a few hundred millivolts peak differential coming out of the MEMS. For example, even with 1.5 volt supply and a small voltage application the circuit is able to handle these voltages. However, if very loud sound has to be processed (e.g., a SPL of up to 140 dBSPL) then the voltage level increases by 20 dB, and thus the signal swing at the MEMS can obtain several Volts. By supplying one or more components of the data path component 110 with a setting or voltage calibrated then the signals can vary that are fed to the modulator component 506 and the dynamic range of the microphone can thus vary as well. In one example, a feedback loop can be initiated that varies commands communicated via the supply terminal 208 based on the input signals received at an input of the system 500. In turn, commands can be generated that alter one or more settings, parameter, operations or modes of the sensor 104 or the data path component 110, for example.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 6:
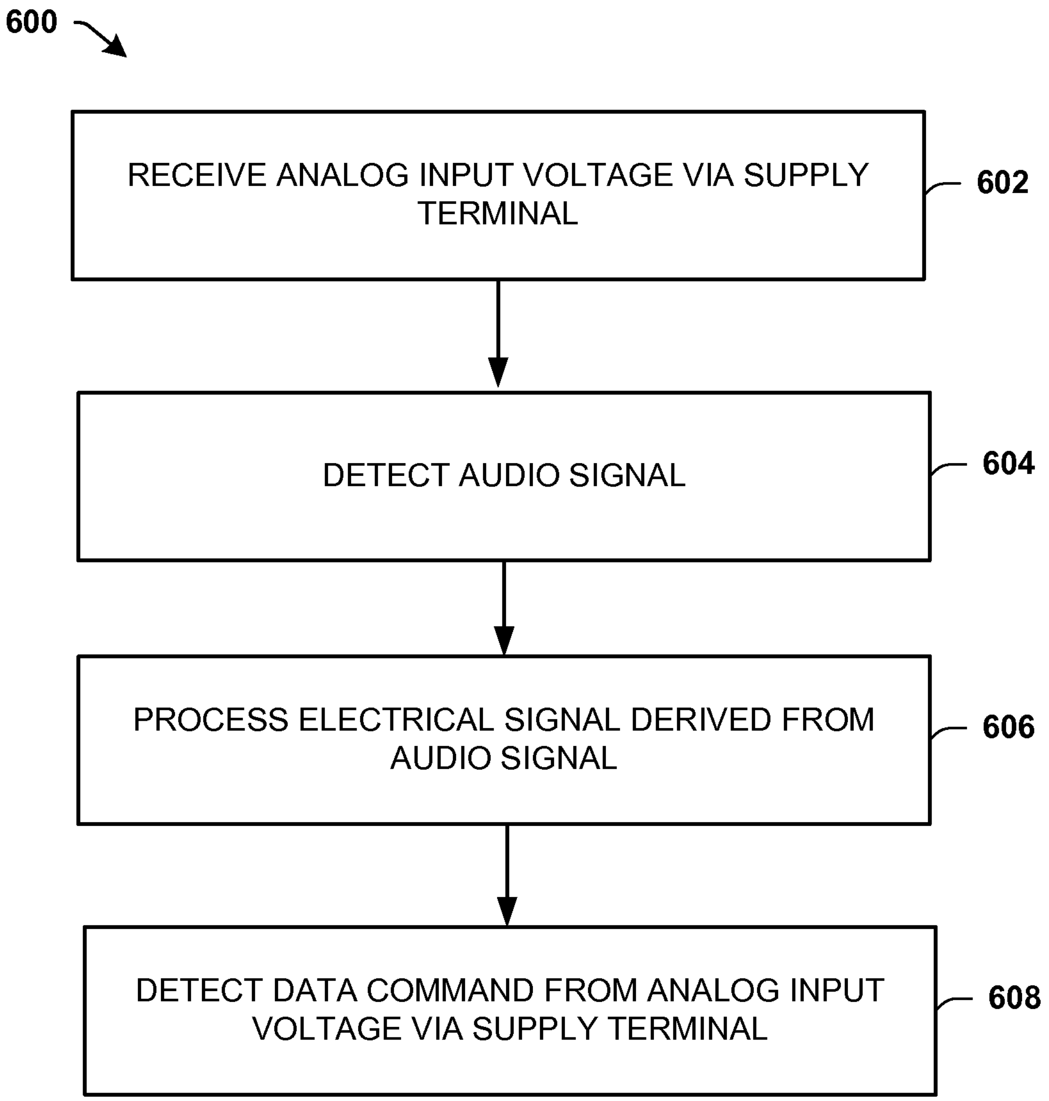
FIG. 6 is a flow diagram illustrating a method of an audio or a microphone system according to various aspects described.

Referring to FIG. 6, illustrated is a method 600 that enables communication with a microphone device having a sensor system on a chip via a single supply terminal in accordance with various aspects. At 602, an analog input voltage is received by the microphone device (e.g., device 102) on a chip via a supply terminal (e.g., supply terminal 208).

At 604, a sensor (e.g., sensor component 104) detects an audio signal and generates an electrical signal based on the detected audio signal.

At 606, a sensor data path (e.g., data path component 110) processes the electrical signal derived from the sensor to generate a modulated output signal at an output terminal.

At 608, an interface component (e.g., interface component 108) comprising the supply terminal receives an analog input voltage via the supply terminal to supply the analog input voltage to the sensor data path and detects a set of commands from the analog input voltage. The interface component 208 is further configured to derive one or more parameter values from the set of commands and communicate the one or more parameter values to a charge pump or a processing component of the sensor data path. The interface component 208, for example, is further configured to generate a write operation or a read operation of data to a memory based on the commands received via the supply terminal.

Figure 7:
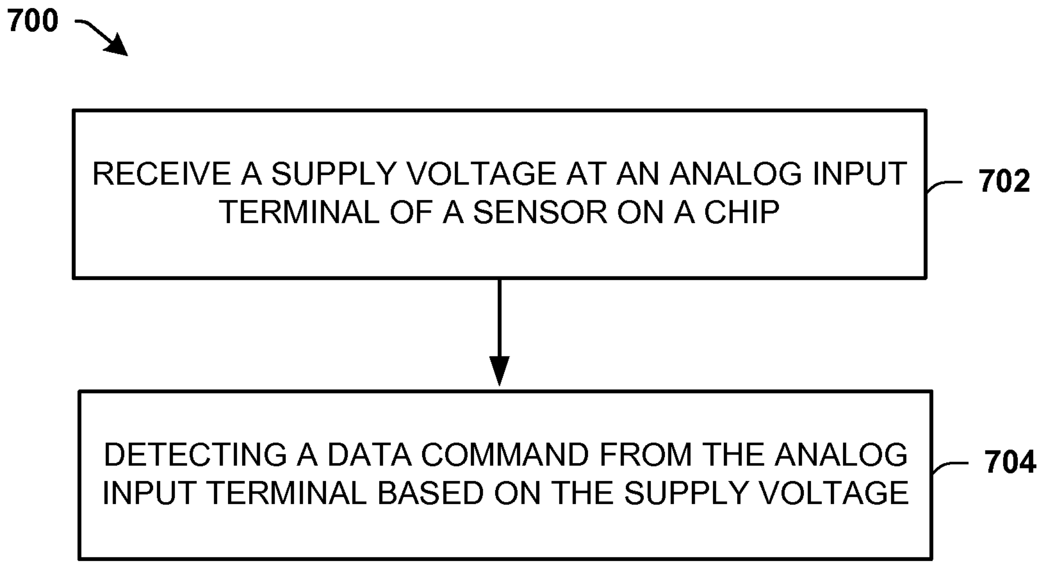
FIG. 7 is a flow diagram illustrating another method of an audio or a microphone system according to various aspects described.

Referring now to FIG. 7, illustrated is another example of a method 700 for a microphone system having an acoustic sensor system on a chip. The method initiates at 702 with a microphone system receiving a supply voltage at an analog input terminal of a sensor on a chip. At 704, the method 700 includes detecting, via an interface component of the sensor system on the chip, a data command from the analog input terminal based on the supply voltage.

The method can further include generating (e.g., the logic component 206) a set of data related to an operational parameter of the sensor system on the chip, and transmitting the set of data related to the operational parameter via the analog input terminal.

Additionally or alternatively, the method comprises deriving a parameter value from the data command based on a change in an amplitude or other signal parameter (e.g., a frequency) of the supply voltage, such as via the input component 202. The data command can facilitate a calibration, a configuration or a testing of a processing component of a sensor data path or a charge pump 408 to a sensor of the sensor system on the chip. The interface component 108 can further operate to generate a bidirectional communication via the analog input terminal while receiving the supply voltage. A set of data related to an operational parameter of the sensor system on the chip can further be generated based on a change in a current received at the interface component and then transmitted via the analog input terminal. The parameter can include data for communicating test data, operational data or configuration data for facilitating operations related to a testing, an operation or a configuration of the signal processing components of the system, for example.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature may have been disclosed with respect to only one of several implementations, such feature may be combined with one or more other features of the other implementations as may be desired and advantageous for any given or particular application.

What is claimed is:

1. A microphone system comprising:

a sensor component configured to detect an audio signal based on an electrical signal generated from a membrane change;

a data path component configured to process the electrical signal from the sensor component to generate an output signal at an output terminal; and an interface component comprising a supply terminal, wherein the supply terminal is configured to concurrently receive a supply signal from a power source and to receive, or transmit, one or more data commands to communicate one or more parameters related to the sensor component or the data path component.

2. The microphone system of claim 1, further comprising:

a communication input component configured to determine the one or more data commands based on a change of a voltage level of the received supply signal, determine the one or more parameters from the one or more data commands and communicate the one or more parameters to the sensor component or the data path component.

3. The microphone system of claim 1, further comprising:

a communication output component configured to determine information related to the sensor component or the data path component and transmit the information in the one or more commands via the supply terminal of the interface component.

4. The microphone system of claim 3, wherein the communication component is further configured to generate the one or more commands based on changes in a current consumption of the sensor component or the data path component.

5. The microphone system of claim 1, wherein the interface component comprises a bidirectional interface configured to receive and transmit the one or more commands via the supply terminal while concurrently receiving a supply voltage as the supply signal to power the sensor component or the data path component.

6. The microphone system of claim 1, wherein the interface component is further configured to determine the one or more parameters from the one or more commands comprising at least one of a calibration setting, a voltage bias, a current bias, an oscillator clock value, a magnitude setting of an interface driver, a digital oscillator level, a feedback value, a voltage pull-in value, or a front end functional test value.

7. The microphone system of claim 1, further comprising:

a logic component configured to determine the one or more parameters from the one or more commands from changes based on a plurality of changes in a supply voltage of the supply signal, generate a digital signal based on the one or more parameters and generate a set of operations of the sensor component or the data path component with the digital signal.

8. The microphone system of claim 7, wherein the set of operations comprises at least one of a calibration operation that initiates a process setting to the sensor component or the data path component, a configuration operation that generates a bias level or a process parameter level to the sensor component or the data path component, or a testing operation that generates a value of a loopback path, a characteristic value or a test level of the sensor component or the data path component.

9. The microphone system of claim 1, further comprising:

a start-up component configured to detect a powering phase of the sensor component or the data path component, activate the interface component in response to the detected powering phase, and inactivate the interface component in response to a completion of the powering phase or a detection of an absence of the one or more commands from the supply signal.

10. The microphone system of claim 1, further comprising:

a checksum component configured to generate a checksum operation to the one or more commands and detect whether bits of the one or more commands satisfy a first predetermined threshold of a data integrity level; and a timeout component configured to generate a time out sequence associated with the one or more commands and cancel the one or more commands in response to the time out sequence satisfying a second predetermined threshold.

11. A microphone device comprising:

a sensor configured to detect an audio signal and generate an electrical signal based on the audio signal;

a sensor data path configured to process the electrical signal derived from the sensor to generate a modulated output signal at an output terminal; and an interface component comprising a supply terminal and configured to receive an analog input voltage via the supply terminal to supply the analog input voltage to the sensor data path and detect a set of commands from the analog input voltage, wherein the interface component is further configured to detect the set of commands based on a change in the analog input voltage and communicate one or more parameter values derived from the set of commands to the sensor or a processing component of the sensor data path.

12. The microphone device of claim 11, wherein the interface component is further configured to communicate the one or more parameter values to a charge pump or the processing component of the sensor data path.

13. The microphone device of claim 11, wherein the interface component is further configured to generate a calibration, a configuration or a testing of the sensor data path with the one or more parameter values derived from the set of commands and communicate a value based on the calibration, the configuration or the testing of the sensor data path from the interface component via the supply terminal.

14. The microphone device of claim 11, wherein the sensor comprises a microelectromechanical sensor configured to detect the audio signal and generate the electrical signal based on a change of a membrane, and wherein the sensor data path comprises the processing component that processes the electrical signal derived from the sensor and a charge pump that is configured to supply a supply voltage to the microelectromechanical sensor or the processing component based on the analog input voltage and the set of commands from the supply terminal.

15. The microphone device of claim 11, wherein the interface component is further configured to transmit, via the supply terminal, data related to the sensor or the processing component based on a change of a current from the sensor or the processing component.

16. The microphone device of claim 11, wherein the interface component is further configured to generate a write operation or a read operation of data to a memory based on the commands received via the supply terminal.

17. A method for a microphone system comprising:

detecting, via a sensor component, an audio signal based on an electrical signal from a membrane change;

processing, via a data path component, the electrical signal from the sensor component to generate an output signal at an output terminal; and receiving, via an interface component, a supply voltage at a supply terminal from a power source and concurrently receiving, or transmitting, at the supply terminal, a data command to communicate one or more parameters related to the sensor component or the data path component.

18. The method of claim 17, further comprising:

generating a set of data related to an operational parameter of the sensor component; and transmitting the set of data related to the operational parameter via the supply terminal.

19. The method of claim 17, further comprising:

deriving a parameter value from the data command based on a change in an amplitude of the supply voltage; and facilitating a calibration, a configuration or a testing of a processing component of a sensor data path or a charge pump to the sensor component.

20. The method of claim 17, further comprising:

generating a set of data related to an operational parameter of the sensor component based on a change in a current received at the interface component; and transmitting the set of data related to the operational parameter via the supply terminal.

21. The method of claim 17, further comprising:

generating a bidirectional communication via the supply terminal while receiving the supply voltage via the supply terminal.

22. The method of claim 17, further comprising:

communicating a gain setting to a processing component of a sensor data path of the sensor system on the chip based on the detected data command from the supply terminal.

23. The method of claim 17, further comprising:

supplying the supply voltage from the supply terminal to the sensor component;

generating a digital data word based on changes in the supply voltage at the supply terminal; and communicating the digital data word to the sensor component to configure at least one operational parameter that facilitates processing of an audio signal detected by the sensor component.

24. The method of claim 17, further comprising:

communicating, via the supply terminal, a test data from a test operation facilitated by the data command to the sensor component.

* * * * *